United States Patent [19]
Yokoi et al.

[11] Patent Number: 5,945,370
[45] Date of Patent: Aug. 31, 1999

[54] COMPOSITE OXIDE HAVING OXYGEN ABSORBING AND DESORBING CAPABILITY AND METHOD FOR PREPARING THE SAME

[75] Inventors: Hideo Yokoi, Sanda; Tadatoshi Murota, Miki; Kazuhito Fujiwara, Kakogawa; Hirofumi Takemori, Kobe, all of Japan

[73] Assignee: Santoku Metal Industry Co., Ltd, Hyogo-Ken, Japan

[21] Appl. No.: 08/973,515

[22] PCT Filed: Apr. 4, 1997

[86] PCT No.: PCT/JP97/01173

§ 371 Date: Dec. 5, 1997

§ 102(e) Date: Dec. 5, 1997

[87] PCT Pub. No.: WO97/37933

PCT Pub. Date: Oct. 16, 1997

[30] Foreign Application Priority Data

Apr. 5, 1996 [JP] Japan ................................ 8-083753

[51] Int. Cl.[6] .............................. B01J 23/10; C01F 17/00; C04B 35/50
[52] U.S. Cl. ........................ 502/304; 502/302; 423/263; 501/152
[58] Field of Search ................... 502/302, 304; 423/263; 501/152

[56] References Cited

U.S. PATENT DOCUMENTS 3,956,461  5/1976  Donohue ................................ 423/263
5,478,543  12/1995  Murota et al. .
5,571,492  11/1996  Yao et al. .
5,580,536  12/1996  Yao et al. .
5,582,785  12/1996  Yao et al. .
5,830,242  11/1998  Yao ........................................ 423/263

FOREIGN PATENT DOCUMENTS 6-92638   4/1994   Japan .
7-16452   1/1995   Japan .
8-103650  4/1996   Japan .
8-109020  4/1996   Japan .

*Primary Examiner*—Elizabeth D. Wood
*Attorney, Agent, or Firm*—Darby & Darby

[57] ABSTRACT

A composite oxide having oxygen absorbing and desorbing capability containing 90 to 100 weight % total of cerium, zirconium, and hafnium based on a total amount of metals contained in the composite oxide, the total amount of cerium, zirconium, and hafnium consisting of 14.0 to 70.5 at % cerium, 29.49 to 72.5 at % zirconium, and 0.01 to 13.5 at % hafnium, wherein degree of solid solution of the composite oxide is not lower than 70%, and wherein the composite oxide has reducing property that not less than 90% of tetravalent cerium contained in the composite oxide is reduced into trivalent cerium when the composite oxide is held at 600° C. under a reducing atmosphere; and a method for preparing the composite oxide including the steps of preparing a composite salt from a starting material solution wherein 85 weight % or more of the cerium ions are $Ce_{4+}$ by coprecipitation, and subjecting the resulting precipitate to a particular calcining steps including reducing calcination.

16 Claims, 3 Drawing Sheets

Reduction Ratio of Composite Oxide and Amount of Oxygen Desorbed Therefrom

Reduction Ratio of Composite Oxide and Amount of Oxygen Desorbed Therefrom

COMPOSITE OXIDE HAVING OXYGEN ABSORBING AND DESORBING CAPABILITY AND METHOD FOR PREPARING THE SAME

FIELD OF ART

The present invention relates to a composite oxide having particularly excellent oxygen absorbing and desorbing capability and useful as a co-catalyst for a catalyst for purifying exhaust gases and as functional ceramics, and a method for preparing the same.

BACKGROUND ART

A large amount of cerium oxide has conventionally been used as a co-catalyst for a catalyst for purifying exhaust gases, ceramics, and the like. In the field of catalysts, for example, properties of cerium oxide, which absorbs oxygen under the oxidizing atmosphere and desorbs oxygen under the reducing atmosphere, are utilized for improving the efficiency in purifying exhaust gases containing HC/CO/NOx as its components. In the field of ceramics, the cerium oxide is used in the form of a mixture or a compound with other elements as electrically conductive ceramics such as solid electrolyte, taking advantage of characteristic properties mentioned above.

However, though the conventional oxide mainly composed of cerium oxide has certain oxygen absorbing and desorbing capability, it cannot exhibit the capability sufficiently at about 600° C. Further, at a temperature as high as 700° C. or higher, the performance of the oxide is deteriorated.

In order to overcome such drawbacks, there is proposed a composite oxide mainly composed of cerium and zirconium. There are known, for example, a composite oxide containing cerium and zirconium (Japanese Laid-open Patent Application No. 4-334548), cerium dioxide containing zirconium having a large specific surface area prepared by adding 1to 20 weight % zirconium oxide to cerium oxide (Japanese Patent Publication No. 6-74145), and a cerium-zirconium composite oxide exhibiting the oxygen absorbing and desorbing capability of 100 $\mu$mol/g or more at 400 to 700° C. (Japanese Laid-open Patent Application No. 5-28672).

As a further improvement of the above-mentioned composite oxides, there is also proposed a composite oxide containing a third element in addition to cerium and zirconium. Examples of such composite oxide include, for example, a composite oxide composed of cerium, zirconium, and lanthanum (Japanese Laid-open Patent Application No. 6-154606), and a composite oxide containing cerium oxide, zirconium oxide, and hafnium oxide (Japanese Laid-open Patent Application No. 7-16452).

The conventional composite oxide containing cerium, however, is low in the degree of solid solution in the crystal phase. Further, a composite oxide is not known which can be reduced sufficiently under the reducing atmosphere at a temperature as low as 600 ° C. Accordingly, development of a composite oxide containing cerium oxide which exhibits sufficient oxygen absorbing and desorbing capability at low temperatures is demanded.

The conventional composite oxide containing cerium is generally prepared, for example, by a process including the steps of preparing a nitrate solution or a chloride solution containing cerium ions as well as zirconium ions, lanthanum ions, and hafnium ions which are necessary for composition; adding oxalic acid or an alkali compound such as ammonium bicarbonate to the solution to precipitate the metals mentioned above as a composite salt; and calcining the resulting precipitate. It is commonly known that the cerium ions used in the preparation of the composite oxide are trivalent cerium ions unless otherwise mentioned. The reason for this fact is explained, for example, in *Inorganic Chemistry, New Edition*, Volume 1, Toshizo Chitani, Sangyo Tosho Kabushiki Kaisha, p311 (1959). According to this reference, solutions of tetravalent cerium salts are prone to be oxidized very easily, and chlorides of tetravalent cerium easily release chlorine to become chlorides of trivalent cerium. Thus, solutions of cerium salts are stable when the cerium ions are trivalent, and therefore tetravalent cerium salts and solutions thereof are not usually marketed.

It is conventionally known that tetravalent cerium salts and solutions thereof can be obtained in the form of nitrates, sulfates, or composite salts of ammonium nitrates in the process of cerium purification, though such salts are unstable. However, it is not known widely to use the tetravalent cerium salts and the solutions thereof.

DISCLOSURE OF THE INVENTION

It is an object of the present invention to provide a novel composite oxide which exhibits excellent oxygen absorbing and desorbing capability particularly at low temperatures, and which can be used as a co-catalyst for a catalyst for purifying exhaust gases and as functional ceramics.

It is another object of the present invention to provide a method for easily preparing a composite oxide of which degree of solid solution is not lower than 70%, and which exhibits excellent oxygen absorbing and desorbing capability even at low temperatures.

According to the present invention, there is provided a composite oxide having oxygen absorbing and desorbing capability comprising 90 to 100 weight % total of cerium, zirconium, and hafnium based on a total amount of metals contained in the composite oxide, the total amount of cerium, zirconium, and hafnium consisting of 14.0 to 70.5 at % cerium, 29.49 to 72.5 at % zirconium, and 0.01 to 13.5 at % hafnium, wherein degree of solid solution of said composite oxide is not lower than 70%, and wherein said composite oxide has reducing property that not less than 90% of tetravalent cerium contained in the composite oxide is reduced into trivalent cerium when the composite oxide is held at 600° C. under a reducing atmosphere.

According to the present invention, there is further provided a method for preparing the composite oxide mentioned above comprising the steps of:

(a) precipitating a composite salt from a starting material solution containing cerium ions, zirconium ions, and hafnium ions, 85 to 100 weight % of said cerium ions contained in the starting material solution being tetravalent, (b-1) subjecting said precipitated composite salt to oxidizing calcination under an oxidizing atmosphere to obtain an oxidized, calcined product, and (b-2) subjecting said oxidized, calcined product at least once to reducing calcination followed by oxidizing calcination (sometimes referred to as the first method hereinbelow).

According to the present invention, there is further provided a method for preparing the composite oxide mentioned above comprising the steps of:

(a) precipitating a composite salt from a starting material solution containing cerium ions, zirconium ions, and hafnium ions, 85 to 100 weight % of said cerium ions contained in the starting material solution being tetravalent, and (b) subjecting said precipitated composite salt at least once to reducing calcination followed by oxidizing calcination (sometimes referred to as the second method hereinbelow).

PREFERRED EMBODIMENT OF THE INVENTION

Figure 1:
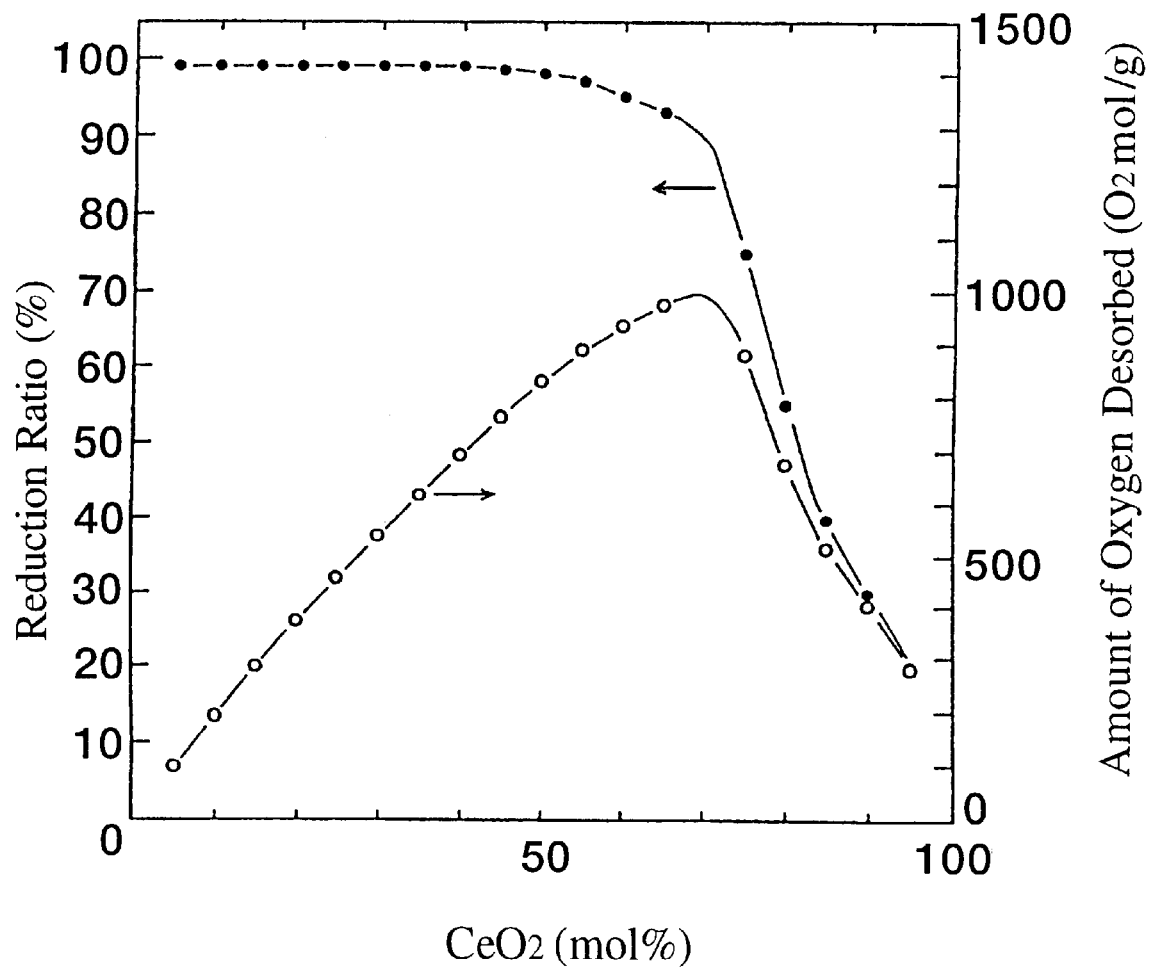
FIG. 1 is a graph showing the relationship between the reduction ratio of the composite oxide and the amount of desorbed oxygen.

The present invention will now be explained in detail hereinbelow.

The composite oxide of the present invention contains, as requisite metals, cerium, zirconium, and hafnium in total of 90 to 100 weight % of the total amount of metals contained in the composite oxide, and specifically the content of each element is 14.0 to 70.5 at %, preferably 40 to 60 at % cerium, 29.49 to 72.5 at %, preferably 39.9 to 59.9 at % zirconium, and 0.01 to 13.5 at %, preferably 0.1 to 10 at % hafnium, based on the total amount of the requisite metals, the total of these elements being 100 at %. If the contents of the requisite metals are outside the above range, sufficient oxygen absorbing and desorbing capability cannot be achieved. In particular, since the valencies of zirconium and hafnium are both constant at 4, the crystal structure of the composite oxide obtained due to the difference between the ion radius of hafnium and that of zirconium is stabilized by adjusting the content of hafnium within the above range.

In the composite oxide of the present invention, other metals may be contained in addition to the requisite metals. Examples of such other metals may include metals such as titanium, tungsten, nickel, copper, iron, aluminum, silicon, beryllium, magnesium, calcium, strontium, and barium; rare earth metals other than cerium; and mixtures thereof. The content of such other metals is less than 10 weight % of the total weight of the metals contained in the composite oxide.

The composite oxide of the present invention has a characteristic structure close to that of the complete solid solution wherein the degree of solidsolution, i.e. the content of solid solution in the crystal phase of the composite oxide, is not lower than 70%, preferably not lower than 75%. Thus, when the composite oxide is heated under a reducing atmosphere such as in a hydrogen stream, the cerium contained in the composite oxide, which is tetravalent when the composite oxide is produced, is easily reduced to become trivalent, thereby forming a pyrochlore phase ($Ce_2Zr_2O_7$) or a similar crystal phase, causing excellent oxygen absorbing and desorbing capability. The degree of solid solution may be measured by the following method.

Method of Measuring Degree of Solid Solution in Composite Oxide

The degree of solid solution in the composite oxide is determined by measuring the lattice parameter of the composite oxide by X-ray diffraction, and calculating the ratio of the measured lattice parameter to the theoretical lattice parameter for a complete solid solution (This method is described, for example, in *X-ray Diffraction Analysis*, 95 (1991), Masanori Kato.). Accordingly, when the crystal structure and the lattice parameter are already known, the degree of solid solution may be determined by calculating the spacing of each lattice plane using a relational expression between the lattice parameter and the exponents, and calculating the ratio of the measured value to the calculated lattice spacing. Specifically, first the lattice spacing is obtained by formula (1) as lattice spacing $d_{hkl}$ on the (h, k, l) plane of the crystal of the composite oxide.

$$2d_{hkl} \sin \theta = \lambda \tag{1}$$

In the formula (1), $\lambda$ stands for the wave length of the measuring beam. For example, when an X-ray tube with Cu target is used for providing the measuring beam, $\lambda$ is 1.54056. In this case, when the formula (1) is solved for $d_{hkl}$, $d_{hkl}=1.54056/2 \sin \theta$ ($\theta$=diffraction angle) is obtained, and the lattice spacing is thus obtained.

On the other hand, when the crystal of the composite oxide is of cubic system, the lattice parameter and the lattice spacing dhkl satisfy the formula (2):

$$1/d_{hkl}^2 = h^2 + k^2 + l^2 / A^2 \tag{2}$$

(A = lattice parameter)

When the formula (2) is solved for the lattice parameter A, $A=(d_{hkl}^2 (h^2+k^2+l^2))^{1/2}$ is obtained, and the lattice parameter is thus obtained.

According to *X-ray crystallography*, Volume I, 307 (1959) Edited by Isamu Nitta, in order for two substances to be mutually dissolved at any ratio to form a substitutional solid solution, the two substances should have similar lattice patterns, following the Vegard's law. Also, the difference in size of the atoms of each substance forming the solid solution is usually less than 15%. Denoting the lattice parameters of each substance forming the substitutional solid solution by $A_1$ and $A_2$, and the atomic densities thereof by $C_1$ and $C_2$, the lattice parameter A of the solid solution is obtained by the formula (3):

$$A^n = A_1^n C_1^n + A_2^n C_2^n \tag{3}$$

wherein n is close to 1. In the case of a solid solution of $CeO_2$, $ZrO_2$, and $HfO_2$, since the ion radius of $Ce^{4+}$ is 0.90 Å, that of $Zr^{4+}$ is 0.79 Å, and that of $Hf^{4+}$ is 0.78 Å (*Ceramics*, Itaru Yasui, 14,927 (1979)), and thus the difference between the size of a Ce atom and that of a Zr atom is within 15%, the Vegard's law mentioned above may be applied. In the cubic system, the lattice parameter of $CeO_2$ is 5.41 Å and that of $ZrO_2$ is 5.07 Å (*Chemical Handbook*, Edited by The Chemical Society of Japan, 1017 (1958)). Substituting the atomic densities $C_1$ and $C_2$ by 50 mol%, respectively, the theoretical lattice parameter of the complete solid solution of $CeO_2$ and $ZrO_2$ is obtained by the formula (3), i.e., A=5.41 Å×0.5+5.07 Å×0.5 =5.24 Å. In this way, the degree of solid solution is obtained by calculating the theoretical lattice parameter for each composition, and obtaining the ratio of the lattice parameter calculated from the measured value to the theoretical lattice parameter in percent. The ion radii of $Zr^{4+}$ and $Hf^{4+}$ are so close that $HfO_2$ may be regarded as being completely dissolved in $ZrO_2$. In the above case, the theoretical lattice parameter of $ZrO_2$ in the cubic system is regarded as the one including $HfO_2$ in calculating the degree of solid solution.

The composite oxide of the present invention has a characteristically excellent reducing property at low temperatures, that is, not less than 90%, preferably 93 to 100% of the tetravalent cerium contained in the composite oxide is reduced to trivalent cerium when the composite oxide is held at 600° C. under a reducing atmosphere such as a hydrogen atmosphere or a carbon monoxide atmosphere. The reduction ratio may be determined by calculating the ratio of the total amount of oxygen desorbed up to 600°C. measured by a method of measuring the oxygen absorbing and desorbing capability to be described below to the theoretical amount of oxygen supposed to be desorbed when 100% of the tetravalent cerium contained in the composite oxide is reduced into trivalent cerium.

The oxygen absorbing and desorbing capability of the composite oxide may be measured by the system (TPR Measuring System manufactured by SANTOKU METAL INDUSTRY CO., LTD.) described in and shown in FIG. 1 of T. Murota, T. Hasegawa, S. Aozasa, *Journal of Alloys and Compounds*, 193 (1993) p298. Specifically, 1 g of a sample is charged in a quartz tube installed in a tubular furnace, and heated up to 200 to 1000° C. over 1 hour in the stream of a 10% hydrogen gas diluted with an argon gas at 0.1 atm. The oxygen from the sample is reacted with the hydrogen to become $H_2O$, and the amount of thus generated $H_2O$ is measured by sensing the difference between $H_2O$ and the hydrogen gas in thermal conductivity at the thermal conductivity sensing portion of the gas chromatograph. Therefore, the total amount of oxygen desorbed up to 600° C. is determined by the TPR curve drawn from the amounts of oxygen at each temperature.

For the purpose of demonstrating that the reduction ratio of the composite oxide of the present invention results in superior oxygen absorbing and desorbing capability, the relationship between the reduction ratio of $Ce^{4+}$ in the composite oxide of the present invention into $Ce^{3+}$ when the composite oxide is held at 600° C. under a reducing atmosphere and the oxygen desorbing capability is shown in FIG. 1.

The conventional composite oxide containing cerium does not have the high degree of solid solution and the excellent reduction ratio at low temperatures, which properties are characteristic to the composite oxide of the present invention. This is believed to be attributed to the fact that the conventional composite oxide containing cerium is prepared from the starting material solution which does not contain the particular amount of tetravalent cerium ions, and that the conventional composite oxide is prepared without the particular compositional adjustment and the particular calcining steps. For example, when zirconium and hafnium are precipitated from an acid aqueous solution containing zirconium and hafnium by neutralization with alkali, the precipitation is started near pH 2 and completed by pH 4. On the other hand, when cerium is precipitated from an aqueous solution of trivalent cerium by adding an alkali compound to the solution, the precipitation is started barely at pH 4 to 6, and is not completed up until pH 6 or higher. Accordingly, when an aqueous solution of cerium and a mixed salt of zirconium and hafnium is coprecipitated with an alkali compound for producing a precipitated composite salt, zirconium and hafnium precipitate first, and then cerium precipitates later. Thus, it is hard to obtain a precipitated composite salt having a uniform composition, and mixed hydroxides of cerium and zirconium along with hafnium are obtained. This is believed to be one of the reasons for the difference between the present invention and the prior art.

The composite oxide of the present invention is easily prepared, for example, by the method of the present invention to be described later. However, it may also be prepared, in some cases, only by the oxidizing calcination and without the reducing calcination to be described later, when the mixing ratio of cerium, zirconium, and hafnium, and the conditions for calcination are suitably selected.

In the first and second methods of the present invention, step (a) of precipitating a composite salt from a starting material solution containing the particular cerium ions, zirconium ions, and hafnium ions is first carried out. It is necessary that 85 to 100 weight %, preferably 90 to 100 weight % of the cerium ions contained in the starting material solution is tetravalent. By employing the starting material solution containing the particular ratio of tetravalent cerium ions for preparing the precipitate of the composite salt, and subjecting the resulting precipitate to the particular calcination steps to be-described later, a composite oxide with the desired, high degree of solid solution can be obtained. This is because the tetravalent cerium ions will only be dissolved in a strong acid of pH 2 or lower, and will form a precipitate by neutralization with alkali around pH 2, so that the tetravalent cerium ions will behave in the similar way to the zirconium and hafnium ions contained in the starting material solution in dissolving and precipitating. Therefore, when the precipitate is formed through coprecipitation from a mixed solution of cerium, zirconium, and hafnium by neutralization with alkali, the precipitate is very likely to be a composite hydroxide wherein cerium, zirconium, and hafnium are uniformly integrated. It is believed that the degree of solid solution in the crystal phase of the composite oxide can be made more close to that of the complete solid solution by improving the uniformity of cerium, zirconium, and hafnium in the precipitate, adjusting the composition to the particular composition, and subjecting the precipitate to the particular calcinations.

The starting material solution containing the cerium ions, zirconium ions, and hafnium ions may be prepared by mixing a solution of a cerium salt containing 85 to 100 weight % tetravalent cerium ions, an aqueous solution of a nitrate of zirconium (or an aqueous solution of zirconyl nitrate), and an aqueous solution of a nitrate of zirconium containing hafnium.

The solution of a cerium salt containing 85 to 100 weight % tetravalent cerium ions may be prepared by the following methods:

(1) a method including the steps of neutralizing a commercially available aqueous solution of cerous nitrate with aqua ammonia to form cerous hydroxide; adding hydrogen peroxide to the solution to oxidize the trivalent cerium ions to tetravalent; heating and boiling the resulting solution containing the precipitate for decomposing and removing the residual hydrogen peroxide to precipitate ceric hydroxide; and dissolving the resulting precipitate in concentrated nitric acid to obtain an aqueous solution of tetravalent cerium salt, (2) a method including the steps of neutralizing a commercially available aqueous solution of cerous nitrate with aqua ammonia to form cerous hydroxide; filtering the resulting solution through a filter device such as a filter press to obtain a cake of precipitate; placing the cake of precipitate in a flat-bottom vessel and heating at 100 to 150° C. for 5 to 20 hours in the air for drying to oxidize the trivalent cerium ions into tetravalent; and dissolving the resulting cake of ceric hydroxide in concentrated nitric acid to obtain an aqueous solution of tetravalent cerium salt, or (3) a method including the steps of charging a commercially available aqueous solution of cerous nitrate in an electrolytic cell for electrolytic oxidation; and applying the electric current to anodically oxidize the trivalent cerium ions to tetravalent, thereby obtaining an aqueous solution of ceric nitrate.

The content of the tetravalent cerium ions in the solution of cerium salt may be measured, for example, by oxidation-reduction titration using potassium permanganate.

In preparing the starting material solution, for the purpose of improving the stability of the resulting composite oxide at high temperatures, a solution containing ions of other metals may optionally be admixed, such as titanium ions, tungsten ions, nickel ions, copper ions, iron ions, aluminum ions, silicon ions, beryllium ions, magnesium ions, calcium ions, strontium ions, barium ions, ions of rare earth metals other than cerium, or mixtures thereof.

The concentration of the cerium ions, zirconium ions, and hafnium ions together in the starting material solution is preferably 30 to 200 g/liter, more preferably 50 to 100 g/liter in terms of oxides (tetravalent). The mixing ratio of cerium ions, zirconium ions, and hafnium ions, and optionally the ions of other metals to be added, if necessary, may suitably be selected so that the composition of the metals in the composite oxide to be obtained conforms to the composition of the composite oxide of the present invention. Specifically, it is preferred to mix each ion to have the mixing ratio of $CeO_2:ZrO_2:HfO_2$:oxide of other metals=17–76.9: 23–63:0.01–20:0–10 by weight in terms of oxides.

Precipitation of a composite salt from the starting material solution may be effected by adding an alkali compound to the starting material solution to coprecipitate the metal ions. The alkali compound is preferably an aqueous solution of ammonia and/or an ammonia gas, since the requisite metal ions, namely, cerium ions (85 to 100 weight % of these are tetravalent), zirconium ions, and hafnium ions together start to precipitate near pH 2. When an aqueous solution of ammonia is used, it is preferred to set its concentration to 0.1 to 5 N, more preferably to 0.2 to 3 N. Further, the amount of the aqueous solution of ammonia to be added is preferably set so that the mixing ratio of the starting material solution to the aqueous solution of ammonia is 1:1 to 1:10. When the aqueous solution of ammonia is used, the precipitated composite salt to be obtained is, for example, a composite hydroxide. On the other hand, when an ammonia gas is used, the precipitated composite salt to be obtained is, for example, a hydrated composite oxide or a composite hydroxide.

The precipitated composite salt obtained above may be subjected to filtration through an ordinary filter device such as a filter press, or may be subjected to decantation to reduce the water content. If necessary, hydrothermal treatment or drying may be carried out. Further, in the second method of the present invention to be described later, the precipitated composite salt may be subjected to the calcination step after a carbon source or the like as a reducing agent is added to the composite salt. The hydrothermal treatment may be carried out in an ordinary autoclave preferably at 100 to 135° C. for 1 to 5 hours. The drying may be carried out preferably at a temperature lower than 250° C., but may otherwise be carried out together in the calcination step in the same furnace, for example, in a spray dryer type furnace.

In the first method of the present invention, step (b-1) of subjecting the precipitated composite salt obtained in step (a) to oxidizing calcination under the oxidizing atmosphere is carried out to obtain an oxidized, calcined product. The oxidizing atmosphere may be, for example, the air, a gas with oxygen partial pressure, or an oxygen gas atmosphere. The oxidizing calcination may be carried out preferably at 250° C. or higher, more preferably at 300 to 1000° C., the most preferably at 600 to 1000° C., for 1 to 10 hours.

In the first method of the present invention, step (b-2) of subjecting the oxidized, calcined product obtained in step (b-1) at least once to reducing calcination followed by oxidizing calcination is carried out, thereby obtaining the composite oxide mentioned above. With this step (b-2), the composite oxide of which degree of solid solution is not lower than 70%, and which exhibits excellent reducing property at low temperatures is obtained. It is usually preferred to carry out the reducing calcination followed by oxidizing calcination for 1 to 3 cycles.

The reducing calcination in step (b-2) may be carried out, for example, by a method including the steps of charging the calcined product obtained in step (b-1) in a vacuum furnace; evacuating the furnace; introducing a reducing gas such as a hydrogen gas and carbon monoxide into the furnace; and calcining the product under the reducing atmosphere preferably at 400 to 1000°C., more preferably at 500 to 1000° C. for 0.1 to 10 hours. The reducing calcination may be carried out in the stream of a reducing gas, which may have been diluted with an inert gas. The concentration of the reducing gas, when diluted with an inert gas, is preferably 1% or higher. This reducing calcination may be carried out under the calcining conditions mentioned above with the reducing gas even after the composite oxide is put to use, for example, as a co-catalyst incorporated in a catalyst for purifying exhaust gases.

The reducing calcination in step (b-2) may be carried out after a reducing agent such as a carbon source is admixed with the calcined product obtained in step (b-1). When the carbon source is admixed with the calcined product, the reducing calcination is carried out preferably at 800 to1300° C. for 1 to 10 hours. Thecarbon source may preferably be activated carbon, graphite powders, charcoal powders, soot, or mixtures thereof, and in particular in the form of fine powders of 100 mesh or smaller. Further, the carbon source may also be a solid substance which does not contain inorganic substances such as organic oils, paraffin, organic acid, tar, pitch , oil and fat, or mixtures thereof; or an organic substance in the form of a solution obtained by dissolving an organic substance in a solvent such as kerosene. The organic substance is particularly preferred since it also contains a hydrogen source and is able to reduce the tetravalent cerium more securely. The amount of the carbon source to be mixed is preferably 1 to 1.5 equivalent of the amount of cerium contained in the calcined product obtained in step (b-1). The reducing calcination incorporating the reducing agent may be carried out under the reducing atmosphere or under a non-oxidizing atmosphere such as an inert atmosphere, and may also be carried out, in some cases, under a particular oxidizing atmosphere such as in the air. When the reducing calcination incorporating the reducing agent is carried out in the air, the reducing calcination is effected until the reducing agent is completely consumed, and by continuing the calcination, the oxidizing calcination is then effected. Therefore, the reducing calcination in step (b-2) and the following oxidizing calcination to be described later can be carried out under the same atmosphere, preferably successively. The reducing calcination incorporating the reducing agent under an inert atmosphere or in the air is preferably carried out at 600 to 1000° C., more preferably 800 to 1000° C., for 1 to 10 hours.

Upon carrying out the reducing calcination in step (b-2) , it is preferred to remove in advance any impurities attached to the calcined product obtained in step (b-1). Such impurities may be removed by a method including the steps of charging the calcined product obtained in step (b-1) in a vacuum furnace; evacuating the furnace; introducing an oxygen gas into the furnace; and holding preferably at 200 to 1000° C. for 0.5 to 5 hours.

In step (b-2), the oxidizing calcination following the reducing calcination may preferably be carried out at 600 to 850° C. for 0.5 to 10 hours, after evacuating the furnace again following the reducing calcination to remove the residual reducing gas, and applying the oxidizing atmosphere similar to the one in step (b-1) to the furnace. Alternatively, in the presence of the reducing agent mentioned above, the reducing calcination and the oxidizing calcination may be carried out under the same atmosphere.

In the second method of the present invention, step (b) of subjecting the precipitated composite salt obtained in step (a) at least once to reducing calcination followed by oxidizing calcination is carried out. With this second method, a composite oxide having the particular degree of solid solution and exhibiting the excellent reducing property at low temperatures is obtained. It is usually preferred to carry out the reducing calcination followed by oxidizing calcination for 1 to 3 cycles.

The reducing calcination in step (b) may be carried out by:

(1) calcining the precipitated composite salt obtained in step (a) under a reducing atmosphere;

(2) incorporating a reducing agent such as a carbon source into the precipitated composite salt obtained in step (a), and subjecting the composite salt with the reducing agent to non-oxidizing calcination under a non-oxidizing atmosphere; or (3) incorporating a reducing agent such as a carbon source into the precipitated composite salt obtained in step (a), and calcining the composite salt with the reducing agent under a particular oxidizing atmosphere such as in the air.

In step (b), the reducing calcination by the method (1) mentioned above may be carried out by calcining the precipitated composite salt obtained in step (a) at 600 to 1000° C., preferably at 800 to 1000° C., for 0.1 to 10 hours under the atmosphere similar to the reducing atmosphere for step (b-2) in the first method of the present invention.

For the purpose of carrying out the reducing calcination in step (b) by the method (2) or (3) mentioned above, the reducing agent may be incorporated into the precipitated composite salt obtained in step (a) by incorporating the reducing agent in the starting material solution; by adding the reducing agent during the preparation of the precipitated composite salt; or by mixing the reducing agent with the precipitated composite salt after the preparation thereof. In particular, for mixing the reducing agent with the precipitated composite salt after preparation thereof, it is preferred to mix the reducing agent with the precipitated composite salt in the form of a slurry, followed by drying.

The reducing agent may preferably be the ones listed above as the examples of the carbon source. The content of the carbon source is preferably 1 to 50 g, more preferably 2 to 30 g in terms of carbon per 100 g of cerium (weight in terms of $CeO_2$) in the starting material solution or in the precipitated composite salt. Further, it is preferred to mix the carbon source with the composite salt by a homogenizer to prepare a homogeneous mixture.

In the method (2) mentioned above, "the non-oxidizing calcination under a non-oxidizing atmosphere" means, for example, to calcine the precipitated composite salt containing the reducing agent in a nitrogen gas or an inert gas so that it will not be oxidized under a non-oxidizing atmosphere. The non-oxidizing calcination may preferably be carried out at 600 to 1000° C., more preferably at 800 to 1000° C., for 1 to 10 hours.

In the method (3) mentioned above, the reducing calcination is effected until the reducing agent is completely consumed, and subsequently the oxidizing calcination is effected. Therefore, the oxidizing calcination following the reducing calcination in step (b) can be carried out under the same atmosphere, preferably successively. The calcination by the method (3) may be carried out preferably at 600 to 1000° C. more preferably at 800 to 1000 C., for 1 to 10 hours.

In step (b), the oxidizing calcination following the reducing calcination under the reducing atmosphere according to the method (1) or under the non-oxidizing atmosphere according to the method (2) mentioned above, may be carried out by calcination after evacuating the furnace to remove the residual gas and applying the oxidizing atmosphere similar to the one in step (b-1); or by calcination after or during introduction of an oxidizing gas without evacuating the furnace, when the reducing calcination was effected by non-oxidizing calcination under the inert gas atmosphere. The oxidizing calcination may be carried out preferably at 600 to 1000° C., more preferably 800 to 1000° C., for 1 to 10 hours.

The composite oxide of the present invention has the particular composition containing cerium, zirconium, and hafnium as the requisite metals, has the degree of solid solution of not lower than 70%, and exhibits excellent reducing property when it is held at 600° C. under a reducing atmosphere. Accordingly, the present composite oxide has the oxygen absorbing and desorbing capability superior to that of the conventional cerium-zirconium composite oxide, and is remarkably useful as a co-catalyst or functional ceramics and the like. Further, in the method of the present invention, the particular amount of tetravalent cerium ions are contained as the cerium material, and the particular calcining step is carried out. Accordingly, the composite oxide of the present invention can easily be prepared.

EXAMPLES

The present invention will now be explained in more detail with reference to Examples and Comparative Examples, but the present invention is not limited thereto.

Example 1

290 ml of an aqueous solution of cerous nitrate prepared by dissolving high purity cerous nitrate (manufactured by SANTOKU METAL INDUSTRY CO., LTD. with a purity 99.9%) in water to have the concentration of 100 g/liter in terms of cerium oxide ($CeO_2$) was charged in a beaker. While stirring this solution, a mixed solution prepared by diluting 48 ml of concentrated aqua ammonia and 12 ml of hydrogen peroxide (at the concentration of 35%) with 336 ml of water was continuously charged into the beaker to precipitate cerium in the form of a hydroxide and simultaneously oxidize the hydroxide, thereby forming ceric hydroxide. After that, the solution containing the precipitate was heated beyond 75° C. or boiled, and continuously stirred for additional 2 hours to decompose and remove the residual hydrogen peroxide. After the completion of the precipitation, the supernatant was removed by decantation, and 52 ml of concentrated nitric acid (at the concentration of 66%) was charged to dissolve the precipitate, thereby obtaining 312 ml of a ceric nitrate solution at the concentration of 93 g/liter in terms of cerium oxide ($CeO_2$). This solution was subjected to oxidation-reduction titration using potassium permanganate. As a result, it was revealed that the ratio of tetravalent cerium ions to the total amount of cerium contained in the solution was 99 weight %.

This solution was mixed with 841 ml of an aqueous solution of zirconium nitrate prepared by diluting a zirconium nitrate solution (manufactured by DAIICHI KIGENSO KOGYO CO., LTD. with a purity of 99.9%) with water into the concentration of 25 g/liter in terms of zirconium oxide ($ZrO_2$) and 45 ml of an aqueous solution of hafnium nitrate prepared by dissolving hafnium nitrate (manufactured by WAKO PURE CHEMICAL INDUSTRIES, LTD. with a purity of 97%) in water to have the concentration of 10 g/liter in terms of hafnium oxide ($HfO_2$), thereby preparing an aqueous solution of mixed nitrates having the concentration of 42.1 g/liter in terms of oxides. Next, the thus obtained solution was charged in a stirring vessel, to which separately prepared 1.1 N aqua ammonia was added at the rate of 100 ml/min. to precipitate a composite salt containing cerium, zirconium, and hafnium. After the completion of the precipitation, the supernatant was removed, and the precipitated composite salt was washed twice with pure water and filtered through a Nutsche type filter device. The resulting precipitated composite salt was charged in a furnace, and subjected to oxidizing calcination at 700° C. for 5 hours in the air, thereby obtaining 50.1 gofacerium-zirconium-hafnium composite oxide. The composition of the metals in the resulting composite oxide is shown in Table 1.

Figure 2:
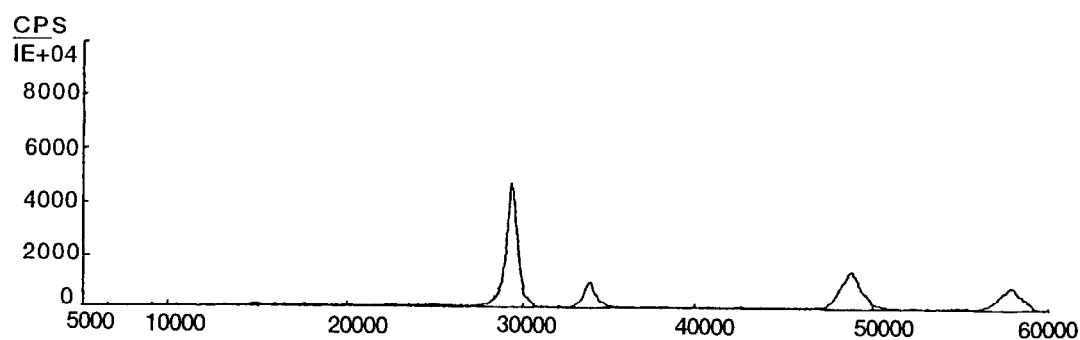
FIG. 2 is a graph showing the XRD pattern obtained by X-ray diffraction of the composite oxide prepared in Example 1.

Further, the composite oxide was measured of the XRD pattern by an X-ray diffraction apparatus manufactured by RIGAKU CORPORATION (target: Cu, tube voltage: 40 KV, tube current: 40 mA, sampling interval: 0.010°, scanning rate: 4°/min.). The results are shown in FIG. 2. The lattice parameter on the (3, 1, 1)plane was 5.291 Å. The degree of solid solution of the obtained composite oxide was calculated in accordance with the method for measuring the degree of solid solution of a composite oxide mentioned above. The results are shown in Table 2. Further, the composite oxide was measured of the oxygen desorbing capability per 1 g of the composite oxide, the oxygen desorbing capability per 1 mol of the composite oxide calculated on the assumption that Ce in the composite oxide was $CeO_2$, and the reduction ratio of $Ce^{4+}$ to $Ce^{3+}$ at 600° C., in accordance with the method for measuring the oxygen desorbing capability and the method for measuring the reduction ratio mentioned above. The results are shown in Table 2. The TPR curve obtained from these measurements was also shown in FIG. 4.

Examples 2 and 3

A composite oxide was prepared in the same way as in Example 1 except that the aqueous solution of ceric nitrate was prepared in the same way as in Example 1 so that the ratio of the tetravalent cerium ions in the aqueous solution of ceric nitrate was as shown in Table 2, and that the composition of the metals in the aqueous solution of the mixed nitrates used in Example 1 was adjusted so as to obtain a composite oxide having the composition of the metals shown in Table 1. The degree of solid solution, the reduction ratio, and the oxygen desorbing capabilities of the resulting composite oxide were measured and calculated in the same way as in Example 1. The results are shown in Table 2.

Example 4

290 ml of an aqueous solution of cerous nitrate prepared by dissolving high purity cerium nitrate (manufactured by SANTOKU METAL INDUSTRY CO., LTD. with a purity of 99.9%) in water to have the concentration of 100 g/liter in terms of cerium oxide ($CeO_2$) was charged in a beaker. While stirring this solution, 337 ml of 2N aqua ammonia was added to the solution to precipitate cerous hydroxide. After the completion of the precipitation, the stirring was continued for 30 minutes, and then the solutionwas left standstill. Subsequently, the resulting precipitate was washed twice by decantation, and filtered through a Nutsche type filter device. The resulting cake of the precipitate was placed in a ceramic vessel, and dried by heating at 120° C. for 5 hours in the air in a drying furnace to oxidize the trivalent cerium to tetravalent, thereby obtaining ceric hydroxide. Next, this hydroxide was dissolved in 150 ml of nitric acid diluted 1:1 with water, thereby obtaining 170 ml of an aqueous solution of ceric nitrate having the concentration of 170 g/liter in terms of cerium oxide ($CeO_2$). This aqueous solution was subjected to the same analysis as in Example 1 to reveal that the ratio of tetravalent cerium ions to the total amount of cerium contained in the solution was 98 weight %.

This solution was mixed with 878 ml of the aqueous solution of zirconium nitrate and 45 ml of the aqueous solution of hafnium nitrate, both prepared in Example 1, thereby preparing an aqueous solution of mixed nitrates having the concentration of 45.7 g/liter in terms of oxides. Subsequently, 49.8 g of a cerium-zirconium-hafnium composite oxide was obtained in the same way as in Example 1. The composition of the metals contained in the resulting composite oxide is shown in Table 1. The degree of solid solution, the reduction ratio, the oxygen desorbing capabilities of the composite oxide were measured and calculated in the same way as in Example 1. The results are shown in Table 2.

Examples 5 to 7

A composite oxide was prepared in the same way as in Example 1 except that the aqueous solution of ceric nitrate was prepared in the same way as in Example 1 so that the ratio of the tetravalent cerium ions in the aqueous solution of ceric nitrate was as shown in Table 2, and that the composition of the metals in the aqueous solution of the mixed nitrates used in Example 1 was adjusted so as to obtain a composite oxide having the composition of the metals shown in Table 1. The degree of solid solution, the reduction ratio, and the oxygen desorbing capabilities of the resulting composite oxide were measured and calculated in the same way as in Example 1. The results are shown in Table 2.

Example 8

The precipitated composite salt prepared in Example 1 was placed in a vacuum furnace, which was then evacuated. A pure oxygen gas was introduced into the furnace, and the furnace was heated to 900° C. and held for 1 hour to remove the impurities attached to the composite salt. After that, the furnace was cooled down to 100° C. and evacuated to remove the oxygen gas, into which furnace a 10% hydrogen gas diluted with argon was then introduced. The precipitated composite salt was subjected to reducing calcination at 1000° C. for 5 hours. Subsequently, the furnace was cooled down to 600° C. and evacuated, into which an oxygen gas was introduced. The precipitated composite salt was subjected to oxidizing calcination at 600° C. for 5 hours, thereby obtaining a composite oxide. The composition of the metals contained in the resulting composite oxide is shown in Table 1. Further, the degree of solid solution, the reduction ratio, and the oxygen desorbing capabilities of the resulting composite oxide were measured and calculated in the same way as in Example 1. The results are shown in Table 2.

Example 9

146 ml of an aqueous solution of ceric nitrate having the concentration of 200 g/liter in terms of cerium oxide ($CeO_2$) prepared in the same way as in Example 1 was mixed with 55 ml of an aqueous solution of zirconium nitrate prepared by diluting a zirconium nitrate solution (manufactured by DAIICHI KIGENSO KAGAKU KOGYO CO., LTD. with a purity of 99.9%) with pure water into the concentration of 25 g/liter in terms of zirconium oxide ($ZrO_2$) and 24 ml of an aqueous solution of hafnium nitrate prepared by dissolving hafnium nitrate (manufactured by WAKO PURE CHEMICAL INDUSTRIES, LTD. with a purity of 99.5%) in pure water to have the concentration of 10 g/liter in terms of hafnium oxide ($HfO_2$). Further, pure water was added to the mixture so that the final volume of the solution was 1 liter, thereby preparing an aqueous solution of mixed nitrates having the concentration of the composite oxide of 50 g/liter. To this solution, 1.5 g of activated carbon powders (manufactured by WAKO PURE CHEMICAL INDUSTRIES, LTD.: special grade) were added and mixed. To 1 liter of the solution obtained above, 1 liter of a separately prepared 1.2 N aqueous solution of ammonia was immediately added and mixed, thereby precipitating a composite salt containing a carbon source. The resulting precipitate was washed by decantation, and then filtered through a Nutsche type filter device. Next, the precipitated composite salt thus collected was washed with 1 liter of pure water for 10 minutes and filtered. After this treatment was repeated twice, the precipitated composite salt was placed in a crucible, and subjected to reducing calcination at 700° C. for 2 hours in a muffle furnace in the stream of a nitrogen gas (non-oxidizing calcination) and to oxidizing calcination at 700° C. for 10 hours in the stream of air, thereby obtaining 50 g of a composite oxide containing cerium, zirconium, and hafnium. The composition of the metals contained in the resulting composite oxide is shown in Table 1. Further, the degree of solid solution, the reduction ratio, and the oxygen desorbing capabilities were measured and calculated in the same way as in Example 1. The results are shown in Table 1.

Example 10

Using an aqueous solution of ceric nitrate wherein the ratio of tetravalent cerium ions to all of the cerium ions in the aqueous solution was 98 weight %, an aqueous solution of mixed nitrates of cerium, zirconium, and hafnium was prepared in the same way as in Example 9. To this aqueous solution of mixed nitrates, 930 ml of 1.2 N aqua ammonia was added to precipitate a composite salt, and the resulting precipitate was washed by decantation. The obtained slurry of the precipitate was heated to 80° C., to which 3 g of paraffin was added and homogenized by a homogenizer, thereby obtaining a precipitated composite salt containing paraffin. The precipitated composite salt thus obtained was placed in a ceramic plate, dried at 150° C. for 2 hours in a muffle furnace in the stream of a nitrogen gas, and then transferred to an atmospheric furnace and calcined at 800° C. for 5 hours, thereby preparing a composite oxide. Through this calcination, the reducing calcination and the oxidizing calcination were carried out in the same furnace. The composition of the metals in the resulting composite oxide is shown in Table 1. Further, the degree of solid solution, the reduction ratio, and the oxygen desorbing capabilities of the resulting composite oxide were measured in the same way as in Example 1. The results are shown in Table 2.

Comparative Example 1

A high purity cerous nitrate solution (manufactured by SANTOKU METAL INDUSTRY CO., LTD. with a purity of 99.9%) was dissolved in water to prepare 290 ml of an aqueous solution of cerium nitrate having the concentration of 100 g/liter in terms of cerium oxide ($CeO_2$). This aqueous solution was analyzed in the same way as in Example 1 to reveal that the ratio of tetravalent cerium ions to the total amount of cerium ions contained in this solution was 0 weight %.

Figure 3:
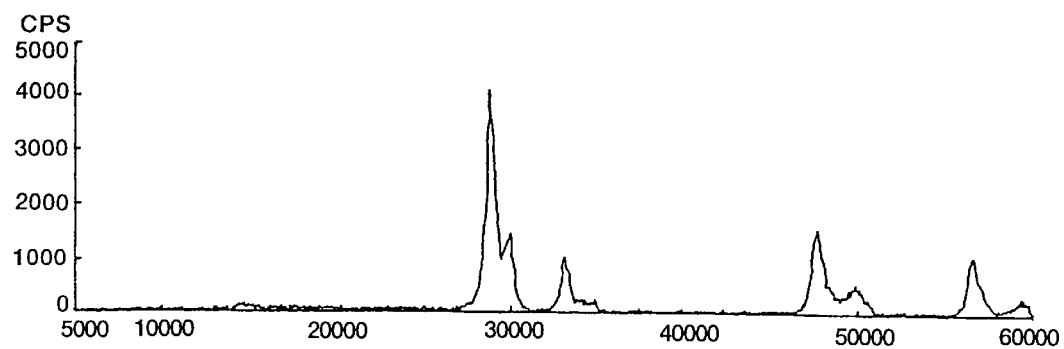
FIG. 3 is a graph showing the XRD pattern obtained by X-ray diffraction of the composite oxide prepared in Comparative Example 1.
Figure 4:
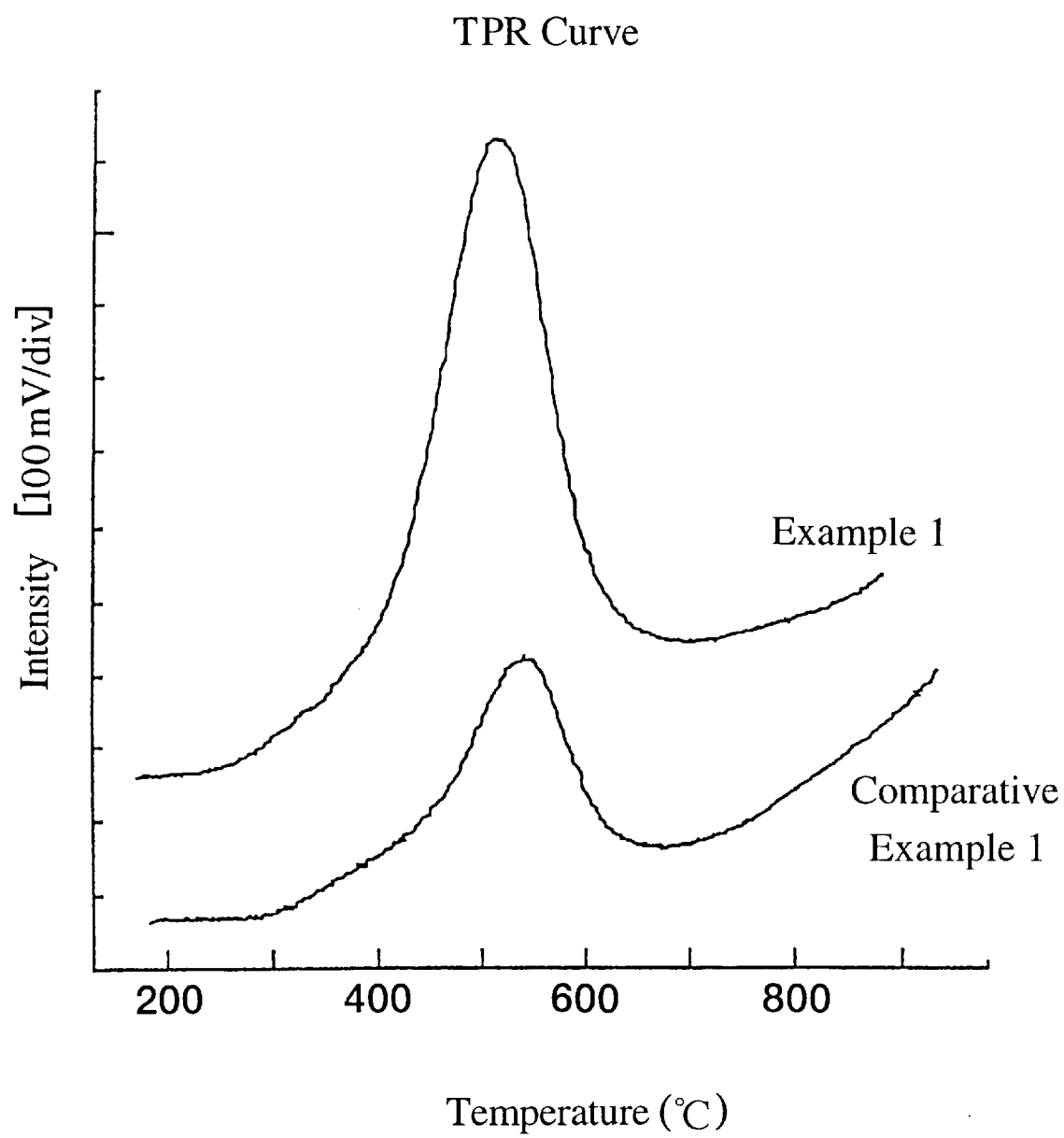
FIG. 4 shows TPR curves obtained by measuring the oxygen desorbing capability of the composite oxides prepared in Example 1 and Comparative Example 1.

This solution was mixed with 840 ml of an aqueous solution of zirconium nitrate prepared by diluting a zirconium nitrate solution (manufactured by DAIICHI KIGENSO KAGAKU KOGYO CO, LTD. with a purity of 99.9%) with pure water into the concentration of 25 g/liter in terms of zirconium oxide ($ZrO_2$) and 45 ml of an aqueous solution of hafnium nitrate prepared by dissolving hafnium nitrate (manufactured by WAKO PURE CHEMICAL INDUSTRIES, LTD. with a purity of 99.5%) in pure water to have the concentration of 10 g/liter in terms of hafnium oxide ($HfO_2$), thereby preparing an aqueous solution of mixed nitrates having the concentration of the composite oxide of 42.1 g/liter. Subsequently, a cerium-zirconium-hafnium composite oxide was prepared in the same way as in Example 1. The composition of the metals contained in the resulting composite oxide is shown in Table 1. Further, the degree of solid solution, the reduction ratio, the oxygen desorbing capabilities, the X-ray diffraction, and the TPR curve of the resulting composite oxide were measured and calculated in the same way as in Example 1. The results of the degree of solid solution, the reduction ratio, and the oxygen desorbing capabilities are shown in Table 2, the X-ray dif fraction pattern is shown in FIG. 3, and the TPR curve is shown in FIG. 4, respectively.

Comparative Example 2

A composite oxide was prepared in the same way as in Comparative Example 1 except that the composition of the aqueous solution of the mixed nitrates used in Comparative Example 1 was adjusted so as to obtain a composite oxide having the composition of the metals as shown in Table 1. The degree of solid solution, the reduction ratio, and the oxygen desorbing capabilities of the resulting composite oxide were measured and calculated in the same way as in Example 1. The results are shown in Table 2.

Comparative Example 3

A composite oxide was prepared in the same way as in Comparative Example 1 except that an additional element was added to the aqueous solution of the mixed nitrates prepared in Comparative Example 1 so that the resulting composite oxide had the composition of the metals as shown in Table 1. The degree of solid solution, the reduction ratio, and the oxygen desorbing capabilities of the resulting composite oxide were measured and calculated in the same way as in Example 1. The results are shown in Table 2.

Comparative Example 4

A composite oxide was prepared by subjecting the composite oxide prepared in Comparative Example 1 to the reducing calcination and the oxidizing calcination in the same way as in Example 8. The composition of the metals in the resulting composite oxide is shown in Table 1. Further, the degree of solid solution, the reduction ratio, and the oxygen desorbing capabilities of the resulting composite oxide were measured and calculated in the same way as in Example 1. The results are shown in Table 2.

Comparative Example 5

A composite oxide was prepared in the same way as in Example 1 except that an aqueous solution of ceric nitrate was used, prepared in the same way as in Example 1 so that the content of the tetravalent cerium ions in the aqueous solution of the ceric nitrate was as shown in Table 2. The degree of solid solution, the reduction ratio, and the oxygen desorbing capabilities of the resulting composite oxide were measured and calculated in the same way as in Example 1. The results are shown in Table 2.

TABLE 1

|  | Ratio of each metal based on total amount of Ce, Zr, and Hf in composite oxide (at %) | | | Content of Ce, Zr, and Hf in metals contained in composite oxide | Content of metal other than Ce, Zr, and Hf in metals contained in composite oxide (wt %) | | |
|---|---|---|---|---|---|---|---|
|  | Ce | Zr | Hf | (wt %) | La | Ca | Nd |
| Example 1 | 48.94 | 50.43 | 0.63 | 100 | — | — | — |
| Example 2 | 31.16 | 68.17 | 0.67 | 100 | — | — | — |
| Example 3 | 57.40 | 42.25 | 0.35 | 100 | — | — | — |
| Example 4 | 47.06 | 52.31 | 0.63 | 100 | — | — | — |
| Example 5 | 48.77 | 50.60 | 0.63 | 99.04 | 0.96 | — | — |
| Example 6 | 48.08 | 51.29 | 0.63 | 98.10 | — | 1.90 | — |
| Example 7 | 49.08 | 50.32 | 0.60 | 97.90 | — | — | 2.10 |
| Example 8 | 48.90 | 50.47 | 0.63 | 100 | — | — | — |
| Example 9 | 49.84 | 49.81 | 0.35 | 100 | — | — | — |
| Example 10 | 49.73 | 49.92 | 0.35 | 100 | — | — | — |
| Comp. Ex. 1 | 48.94 | 50.43 | 0.63 | 100 | — | — | — |
| Comp. Ex. 2 | 31.16 | 68.17 | 0.67 | 100 | — | — | — |
| Comp. EX. 3 | 48.77 | 50.60 | 0.63 | 99.04 | 0.96 | — | — |
| Comp. Ex. 4 | 48.94 | 50.43 | 0.63 | 100 | — | — | — |
| Comp. Ex. 5 | 48.94 | 50.43 | 0.63 | 100 | — | — | — |

TABLE 2

|  | Ratio of $Ce^{4+}$ in starting material (%) | Degree of Solid Solution (%) | Reduction Ratio (%) | Oxygen Desorbing Capabilities | |
|---|---|---|---|---|---|
|  |  |  |  | $O_2$ mmol/mol ($CeO_2$) | $O_2$ $\mu$mol/g |
| Example 1 | 99 | 76 | 98 | 244 | 810 |
| Example 2 | 98 | 83 | 99 | 270 | 605 |
| Example 3 | 99 | 75 | 90 | 224 | 850 |
| Example 4 | 98 | 71 | 91 | 228 | 730 |
| Example 5 | 92 | 76 | 92 | 228 | 745 |
| Example 6 | 91 | 76 | 95 | 237 | 760 |
| Example 7 | 88 | 76 | 91 | 228 | 740 |
| Example 8 | 99 | 76 | 98 | 245 | 810 |
| Example 9 | 99 | 76 | 97 | 242 | 815 |
| Example 10 | 98 | 71 | 99 | 242 | 815 |
| Comp. Ex. 1 | 0 | 12 | 27 | 68 | 225 |
| Comp. Ex. 2 | 0 | 15 | 42 | 114 | 256 |
| Comp. Ex. 3 | 0 | 18 | 28 | 72 | 235 |
| Comp. Ex. 4 | 0 | 58 | 62 | 157 | 521 |
| Comp. Ex. 5 | 80 | 52 | 59 | 148 | 489 |

We claim:

1. A composite oxide having oxygen absorbing and desorbing capability comprising 90 to 100 weight % total of cerium, zirconium, and hafnium based on a total amount of metals contained in the composite oxide, the total amount of cerium, zirconium, and hafnium consisting of 14.0 to 70.5 at % cerium, 29.49 to 72.5 at % zirconium, and 0.01 to 13.5 at % hafnium, wherein degree of solid solution of said composite oxide is not lower than 70%, and wherein said composite oxide has reducing property that not less than 90% of tetravalent cerium contained in the composite oxide is reduced into trivalent cerium when the composite oxide is held at 600° C. under a reducing atmosphere.

2. The composite oxide as claimed in claim 1 further comprising a metal selected from the group consisting of titanium, tungsten, nickel, copper, iron, aluminum, silicon, beryllium, magnesium, calcium, strontium, barium, a rare earth metal other than cerium, and mixtures thereof.

3. A method for preparing the composite oxide as claimed in claim 1 comprising the steps of:

(a) precipitating a composite salt from a starting material solution containing cerium ions, zirconium ions, and hafnium ions, 85 to 100 weight % of said cerium ions contained in the starting material solution being tetravalent, (b-1) subjecting said precipitated composite salt to oxidizing calcination under an oxidizing atmosphere to obtain an oxidized, calcined product, and (b-2) subjecting said oxidized, calcined product at least once to reducing calcination followed by oxidizing calcination.

4. A method for preparing the composite oxide as claimed in claim 1 comprising the steps of:

(a) precipitating a composite salt from a starting material solution containing cerium ions, zirconium ions, and hafnium ions, 85 to 100 weight % of said cerium ions contained in the starting material solution being tetravalent, and (b) subjecting said precipitated composite salt at least once to reducing calcination followed by oxidizing calcination.

5. The method as claimed in claim 3 wherein said starting material solution further contains metal ions selected from the group consisting of titanium ions, tungsten ions, nickel ions, copper ions, iron ions, aluminum ions, silicon ions, beryllium ions, magnesium ions, calcium ions, strontium ions, barium ions, ions of a rare earth metal other than cerium, and mixtures thereof.

6. The method as claimed in claim 3 wherein said step of precipitating a composite salt from a starting material solution is carried out by neutralizing the starting material solution with alkali.

7. The method as claimed in claim 3 wherein in the reducingcalcination insaidstep (b-2), areducingagent is incorporated in the oxidized, calcined product prepared in said step (b-1).

8. The method as claimed in claim 7 wherein said reducing calcination followed by oxidizing calcination in said step (b-2) are carried out in air.

9. The method as claimed in claim 4 wherein said precipitated composite salt contains a reducing agent.

10. The method as claimed in claim 9 wherein said reducing calcination followed by oxidizing calcination are carried out in air.

11. The method as claimed in claim 7 wherein said reducing agent is selected from the group consisting of activated carbon, graphite powders, charcoal powders, ash powders, oil, paraffin, tar, pitch, and mixtures thereof.

12. The method as claimed in claim 4 wherein said staring material solution further contains metal ions selected from the group consisting of titanium ions,tungsten ions, nickel ions, copper ions, iron ions, aluminum ions, silicon ions, beryllium ions, magnesium ions, calcium ions, strontium ions, barium ions, ions of a rare earth metal other than cerium, and mixtures thereof.

13. The method as claimed in claim 4 wherein said step of precipitating a composite salt from a starting material solution is carried out by neutralizing the starting material solution with alkali.

14. The method as claimed in claim 8 wherein said reducing agent is selected from the group consisting of activated carbon, graphite powders, charcoal powders, ash powders, oil, paraffin, tar, pitch, and mixtures thereof.

15. The method as claimed in claim 9 wherein said reducing agent is selected from the group consisting of activated carbon, graphite powders, charcoal powders, ash powders, oil, paraffin, tar, pitch, and mixtures thereof.

16. The method as claimed in claim 10 wherein said reducing agent is selected from the group consisting of activated carbon, graphite powders, charcoal powders, ash powders, oil, paraffin, tar, pitch, and mixtures thereof.

* * * * *